(12) United States Patent
Zu et al.

(10) Patent No.: US 11,799,873 B2
(45) Date of Patent: *Oct. 24, 2023

(54) SYSTEM AND METHOD FOR VERIFICATION OF RELIABILITY AND VALIDITY OF CROWD SOURCING USERS

(71) Applicant: KeKeQiHuo (Shenzhen) Technologies Co., Ltd., Shenzhen (CN)

(72) Inventors: Shaode Zu, XinXiang (CN); Xianwei Willam Shen, Stockholm (SE)

(73) Assignee: KeKeQiHuo (Shenzhen) Technologies Co., Ltd., Shenzhen (CN)

( * ) Notice: Subject to any disclaimer, the term of this patent is extended or adjusted under 35 U.S.C. 154(b) by 303 days.

This patent is subject to a terminal disclaimer.

(21) Appl. No.: 16/953,375

(22) Filed: Nov. 20, 2020

(65) Prior Publication Data

US 2021/0168156 A1   Jun. 3, 2021

Related U.S. Application Data

(63) Continuation of application No. 16/469,269, filed as application No. PCT/SE2018/051122 on Nov. 3, 2018, now Pat. No. 10,904,263.

(51) Int. Cl.
*H04L 9/40* (2022.01)
*G06Q 30/0207* (2023.01)
(Continued)

(52) U.S. Cl.
CPC ......... *H04L 63/12* (2013.01); *G06Q 30/0225* (2013.01); *G06Q 50/01* (2013.01);
(Continued)

(58) Field of Classification Search
CPC ... H04L 63/12; H04L 63/0442; H04L 9/3247; H04L 67/02
See application file for complete search history.

(56) References Cited

U.S. PATENT DOCUMENTS 6,659,861 B1   12/2003   Faris et al.
2011/0313779 A1   12/2011   Herzog et al.
(Continued)

FOREIGN PATENT DOCUMENTS

JP   2013061828 A   4/2013
JP   2013171443 A   9/2013
(Continued)

*Primary Examiner* — Paul E Callahan
(74) *Attorney, Agent, or Firm* — PROI Intellectual Property US; Klaus Michael Schmid

(57) ABSTRACT

This invention relates to systems and methods for verifying reliability and validity of crowd sourcing users and/or reliability and validity of tasks, executed by crowd sourcing users. Key task implementing procedures are computerized and mapped as system events and/or user actions, which can trigger data obtaining when users navigate in the platforms and/or systems. The obtained data from the triggered data obtaining is authenticated. Stamped data chain is constructed from the obtained data. A reference data chain is used to set the expected geographic location and/or time for task implementing. The reference data chain is generated from the reference information supplied by users. Matching process is implemented by checking if the stamped data chain can match with the preset geographic and/or temporal conditions by the reference data chain. The degree of reliability and validity is determined based on the matching results.

18 Claims, 5 Drawing Sheets

(51) Int. Cl.
    *G06Q 50/00*    (2012.01)
    *H04L 9/32*    (2006.01)
    *H04L 67/02*    (2022.01)
    *H04W 4/02*    (2018.01)

(52) U.S. Cl.
    CPC ........ *H04L 9/3247* (2013.01); *H04L 63/0442* (2013.01); *H04L 67/02* (2013.01); *H04W 4/02* (2013.01)

(56) References Cited

U.S. PATENT DOCUMENTS

| | | |
|---|---|---|
| 2014/0281946 A1 | 9/2014 | Avni et al. |
| 2016/0292405 A1 | 10/2016 | Thomas et al. |
| 2017/0034023 A1 | 2/2017 | Nickolov et al. |
| 2017/0221156 A1 | 8/2017 | Mingarelli et al. |

FOREIGN PATENT DOCUMENTS

| | | |
|---|---|---|
| KR | 20160133677 A | 11/2016 |
| WO | 2016124913 A | 8/2016 |

| | Label | Geographic location | Timestamp |
|---|---|---|---|
| 202 | Living address | (59°24'26.9"N 17°57'27.1"E) | (From 11:00 AM CET 20171001 till 07:00 AM CET 20171004) |
| 204 | Departure | (59°39'07.8"N 17°55'26.1"E) | (09:00 AM CET, 20171004) |
| 206 | Arrival | (40°05'02.6"N 116°36'09.5"E) | (15:30 PM CET, 20171005) |

200

| | Label | Geographic Location | Timestamp |
|---|---|---|---|
| System Events | A Registration | (59°24'08.8"N 17°56'44.7"E) | (09:00 AM CET 20171001) |
| | B Taking Info. | (59°24'08.8"N 17°56'44.7"E) | (11:00 AM CET 20171002) |
| | C Uploading | (59°24'08.8"N 17°56'44.7"E) | (11:00 AM CET 20171002) |
| User Actions | A Buying | (59°19'59.8"N 18°04'08.9"E) | (07:00 AM CET 20171004) |
| | B Leaving | (59°39'07.8"N 17°55'26.1"E) | (07:00 AM CET 20171004) |
| | C Arriving | (40°05'02.6"N 116°36'09.5"E) | (16:00 PM CET 20171005) |
| | D Posting | (40°05'02.6"N 116°36'09.5"E) | (16:30 PM CET 20171005) |

Figure 5

| Item | Obtained Data | Extraction Method |
|---|---|---|
| 1 | The GPS coordinates | The GPS coordinates can be obtained from the GPS module, the connected network, the operating system of the user equipment, etc. |
| 2 | The timestamps | The timestamps can be obtained from the GPS module, the operating system of the user equipment, the connected network, etc. |
| 3 | The photos contain spatiotemporal information, e.g. street address, landmarks, clock times, etc. | The spatiotemporal information can be recognized and/or extracted from the collected photos |
| 4 | The address on the Internet for example, the IP address. | The geographic location can be identified from the internet address. |
| 5 | The audios contain spatiotemporal information. | The spatiotemporal information can be recognized and/or extracted from the collected audios. For example, users can report the location and time by voice. |
| 6 | The videos contain spatiotemporal information, e.g. street address, landmarks, clock times, etc. | The spatiotemporal information can be recognized and/or extracted from the videos. |

Figure 6

SYSTEM AND METHOD FOR VERIFICATION OF RELIABILITY AND VALIDITY OF CROWD SOURCING USERS

CROSS REFERENCE TO RELATED APPLICATIONS

The present application is a Continuation Application of U.S. Ser. No. 16/469,269 which is the US national stage of International Patent Application PCT/SE2018/051122 filed on Nov. 3, 2019, which, in turn, claims priority to Swedish Patent Application SE 1730321-5 filed on Nov. 19, 2017. The content of U.S. Ser. No. 16/469,269, PCT/SE2018/051122 and SE 1730321-5 is hereby incorporated by reference in their entirety.

1 FIELD OF INVENTION/KEYWORDS

Crowd sourcing, sharing economy, task verification

2 BACKGROUND OF INVENTION

Crowd sourcing is a specific sourcing model in which individuals or organizations use contributions from Internet users to obtain needed services or goods. One of the crowd sourcing examples is the Amazon Mechanical Turk (MTurk) [1]. The MTurk is a platform that enables the requesters (individuals and businesses) to publish tasks and jobs. In the other side, the crowd sourcing workers can select tasks, work on it, and get paid by delivering tasks to the requesters.

The sharing economy or the access economy refers to a company is an intermediary between consumers who don't know each other, and consumers are paying to access someone else's goods and services. The emerged companies such as Uber [2], Airbnb [3], etc. gained rapid growth since 2015.

3 PROBLEM DESCRIPTION

This invention focus on the online crowd sourcing purchasing platforms and/or systems, which in terms of online websites, mobile APPs, etc.

The typical scenario of the said platforms and/or systems is like this: a requester lives in place A and wants to buy some goods from a different long distance place B. A crowd sourcing buyer is at that place B and is about to come to place A. There is a possibility that the said crowd sourcing buyer can buy and bring that goods to place A for the requester. This is the cross point of crowd sourcing and sharing economy.

However, the validity and reliability of the task executed by unknown crowd sourcing buyers could be a serious problem. For example, there would be crowd sourcing buyers who were not at place B at all, but provide the fake address, and eventually the fake goods to the requesters at place A. The potential for business fraud is always a risk that cannot be ignored when it comes to conducting tractions on the said crowd sourcing based purchasing platforms and/or systems. Thus, the reliability and validity of task execution is a crucial point for the said platform and/or systems to be success.

4 PRIOR ART

Most of the reference regarding the locations or positions of the crowd sourcing buyers are focused on the map generating like the method proposed in the reference [4], or refined localization like the way shown in the reference [5]. The reference [6] proposed a crowd sourcing based merchandise aggregation module. The reference [7] discussed on how to verify the identity and trustworthiness of a online user. In reference [7], the verification is implemented by comparing the information provided by user with a third party information source such as a government. The proposed verification in this invention, however, is implemented by comparing the reference data chain with the sampled data chain.

In sum, none of the listed prior arts have been proposed the similar solution like this invention.

5 BRIEF SUMMARY/ABSTRACT

The present disclosure provides a system and a method for verifying the validity and reliability of one or more users of a crowd sourcing purchasing platform and/or system and/or the validity and reliability of one or more tasks executed by such users or users. The system or method mainly comprises the following elements:

A reference data chain, or a chain of reference data, is provided. For instance, the reference data chain is extracted from certain pre-set information. Such pre-set information is to indicate where and when the expected crowd sourcing task should be implemented and may be provided from various sources, such as supplied by the users;

Certain data which contains spatiotemporal information such as a location and time stamp of a user action is obtained by the platform and/or system. This data obtaining step may be triggered by one or more pre-defined system events (or platform events). This data obtaining step may also be triggered by one or more user actions, i.e. actions performed by the users;

The data obtained above is authenticated, in order to confirm the origin and integrity of such data;

Another data chain is constructed, or built, or rebuilt, from the obtained data. This data chain may be referred to as a stamped data chain;

A verification step is performed, by matching the data chain rebuilt from the obtained data with the reference data chain extracted from the user supplied information;

The degree of the validity and reliability, or the validity and reliability degree, of the users and/or their executed tasks, is determined based on the matching result of last step.

Preferably, the obtained data may comprise one or more of the following data or information: GPS coordinates, time stamps, photos, audios, videos, and IP addresses, to name a few.

Preferably, the step of obtaining the data from the spatiotemporal information may involve sampling the spatiotemporal information and/or extracting the spatiotemporal information.

Preferably, the system events, or platform events, which can trigger the step of obtaining the data may include, but not limited to, one or more of the following events: registration, obtaining information via the platform and/or the system, and uploading information.

Preferably, the system events, or platform events, that can trigger the step of obtaining the data may also include, but not limited to, updating status of one or more of the tasks executed by the users.

Preferably, the updating of status of tasks may include, but not limited to, one or more of accepting a task, implementing a task, and delivering a task result, such as a requested task result.

Preferably, after the data is obtained, for example, the sampling and/or extracting is implemented, the system procedure and/or the user interface may proceed to the next one.

Preferably, the information obtaining via the platform and/or system includes, but is not limited to, one or more photos, one or more videos, one or more audios, and so on.

Preferably, the information uploaded includes, but is not limited to, one or more photos, one or more videos, one or more audios, and so on.

Preferably, user actions that can trigger the step of obtaining the data include, but are not limited to, one or more user behaviors, such as user buying, user posting, user delivering and user using a transportation.

Preferably, using a transportation includes, but is not limited to, user departure and/or user arrival.

Preferably, to build, or rebuild, the stamped data chain may comprise extracting the spatiotemporal information from the obtained data and building, or rebuilding, the stamped data chain from the extracted spatiotemporal information.

Preferably, the verification step may include matching and/or comparing the data chain built, or rebuilt, from the obtained data with the reference data chain, such as the reference data chain extracted from the pre-set information supplied by the users.

Preferably, the method according to the present invention may further include a step of introducing one or more thresholds into the method to determine the degree of the validity and reliability of the users and/or their executed tasks.

Preferably, the thresholds comprise data indicating one or more of distance difference, time difference, and/or any other forms based on distance and/or time.

Preferably, the method according to the present invention may include further system actions which are but not limited to, refusing paying crowd sourcing buyers, raise or lower a user level rating, etc., based on the degree of the validity and reliability that is determined.

This invention provides a system and method of verifying the reliability and validity of task executed by the crowd sourcing buyers. The method is comprised with six basic steps.

Step 1, registration 102. The basic information needs to be submitted to the system, whenever a crowd sourcing buyer wants to take tasks, or a requester wants to publish tasks. Such registration information could be departure and arrival times from place B to A 204 206, valid living address 202, name, etc.

Step 2, reference data chain formation 104. A data chain with location and/or time stamps is extracted from the submitted registration information, such as 202, 204, and 206. The formed data chain from the registration information is termed as the reference data chain 200.

Step 3, data obtaining 106. The data obtaining can be took by the system and/or uploaded by the user. The obtained data could be but not limited to GPS coordinates, time stamps, images, videos, audios, etc. In this invention we focus on the spatiotemporal data obtaining 300. The spatiotemporal data obtaining is triggered by system events and/or actions 302. What system events and/or actions can trigger spatiotemporal data obtaining is determined by specific system designs. The spatiotemporal data obtaining can also be actively provided by the users 304.

Step 4, authentication 108. The obtained data 300 from Step 3 is authenticated by the system 400, 500. For example, the obtained data 300 can be authenticated by the built-in Hash functions 404 (e.g. MD5/SHA-1/SHA-256/SHA-512) and/or digital signature algorithm (DSA) 412.

Step 5, stamped data chain formation 110. The system rebuilds the data chain from the obtained set of data 300. The rebuilt data chain is termed as the stamped data chain 600.

Step 6, verification 112. The verification process is implemented by matching the stamped data chain 600 and the reference data chain 200.

Finally, the validity and reliability degree of the executed tasks by the crowd sourcing buyers can be generated 114 based on the matching degree.

Here, the spatiotemporal information is defined as the location with time stamp.

6 ADVANTAGE OF THE PROPOSED SOLUTION

The core advantage of the proposed invention is that it can verify where and when the tasks are executed. And thus the fake task execution and/or business fraud can be identified by the said system and/or platform.

7 THE BRIEF DESCRIPTION OF THE DRAWINGS

Embodiments of the present disclosure will now be described, by way of example only, with reference to the accompanying drawings, in which like reference numerals are used for like parts, and in which:

FIG. 5 shows an example of a stamped data chain.

FIG. 6 lists the various forms that the obtained data can be and the ways to get the geographic and/or time information.

8 DETAILED DESCRIPTION OF THE INVENTION

Figure 1:
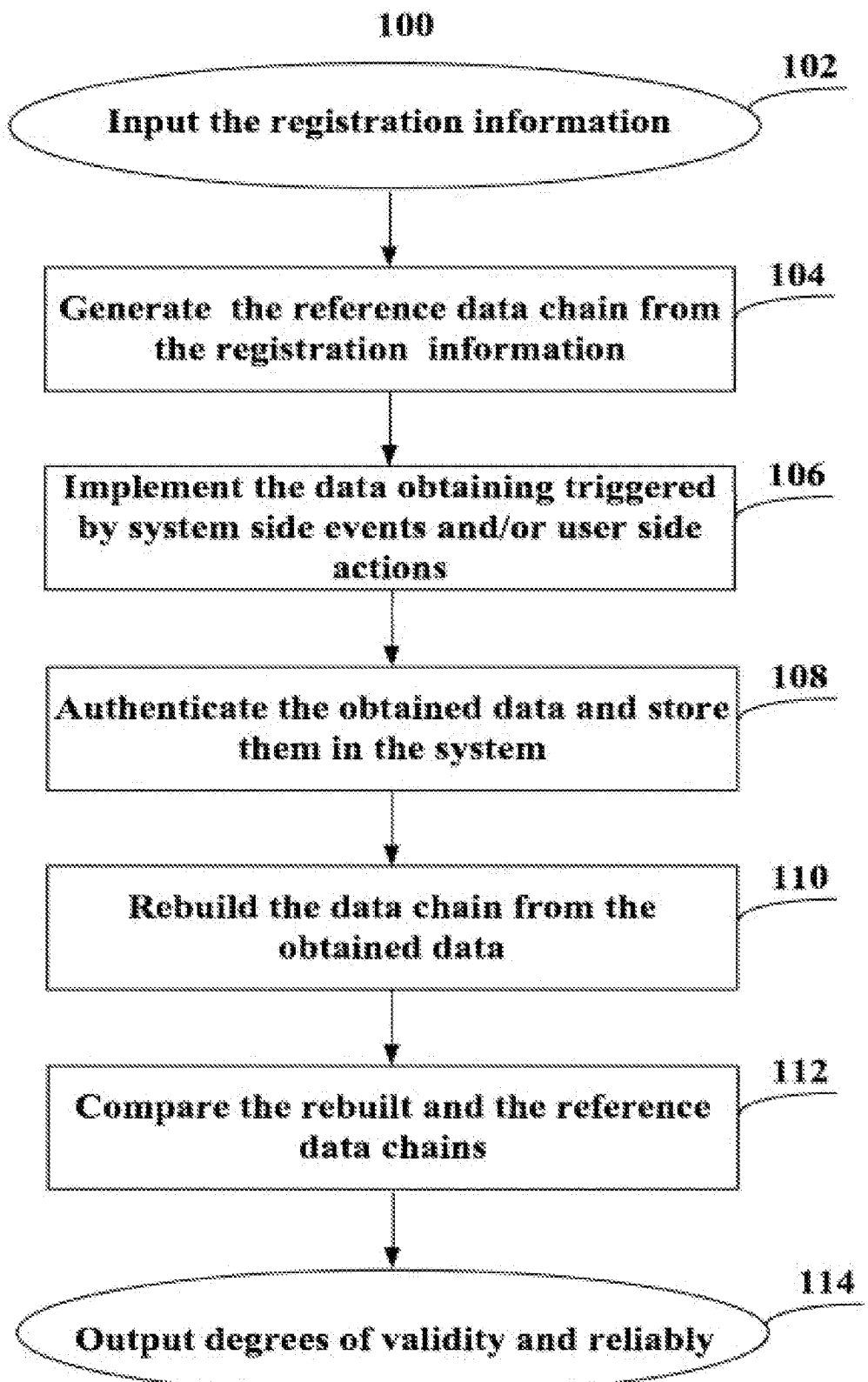
FIG. 1 shows a flow chart illustrating the core steps of this invention.

The core steps of this invention are illustrated in the flowchart in FIG. 1.

As illustrated in the FIG. 1, both the requesters and the crowd sourcing buyers need to be registered with the system for publishing or taking tasks. The registered information 102 including but not limited to, user name, real name, valid address 202 (post address, living address, etc.), the information to pre-set when and where the expected task should be/can be implemented like the traffic information (for example the places and times of flight departure and arrival, 204, 206), payment information (for example credit card number, name on card, etc.).

In the following description, we focus on the crowd sourcing buyers for convenience. All the methods proposed in this invention can be equally applied to the requesters in a straightforward way.

8.1 The Reference Data Chain

The reference spatiotemporal data chain is extracted and generated 104 from the registration information which submitted by the crowd sourcing buyers 102. The geographical information can be obtained from the input valid living address 202 (usually postal address/code), the name of airport, etc. There are many geocoding APIs, like Google Maps [8], GeoPostcodes [9], and Here Geocoder API [10], that can convert civic addresses into geo-coordinates. The geo-coordinates can be in the forms as set of latitude and longitude, three dimension x-y-z coordinates, etc.

The reference time stamp can be extracted from the submitted traffic tickets and/or traffic timetables i.e. the departure and/or arrival times and dates. A standard time zone (for example the Central European Time, CET) is defined by the system designers of the said system and/or platform, and all the collected time stamps are converted with reference to the defined standard time zone.

Figures 2, 3:
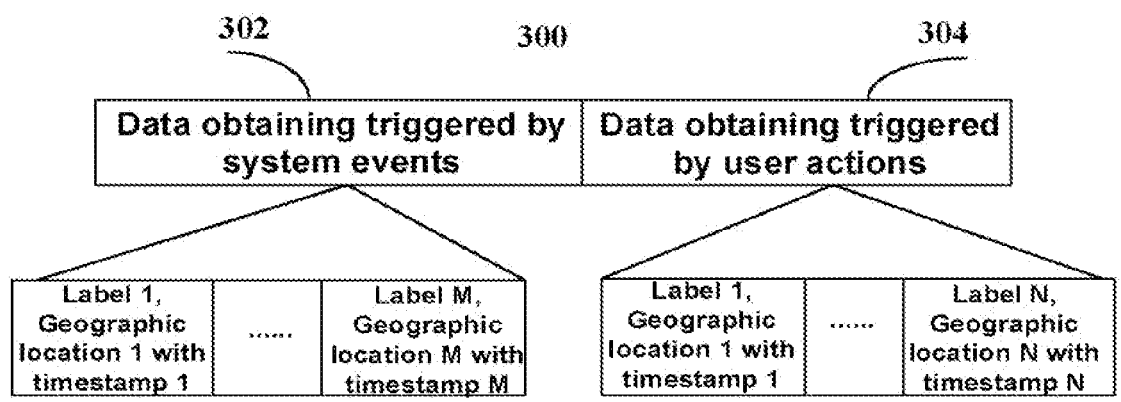
FIG. 2 shows an example of a reference data chain.
FIG. 3 shows an example of the overall data structure for the obtained data that triggered by system events and/or user actions.

Then, the reference data chain 200 can be formed sequentially. An example of the two layer spatiotemporal data chains is illustrated in FIG. 2.

8.2 The Triggered Data Obtaining

Most smart phones on the market equipped with a GPS unit, which paves the way for obtaining the real-time location information, i.e. in terms of GPS coordinates. The current time stamps can be accessed and read from the operating system of the said user equipment, network time, etc.

The spatiotemporal sampling taken in this step 106 is used to indicate where and when the system events 602 and/or user actions 604 are executed.

The target spatiotemporal sampling process 106 can be triggered by the system events 602. Whenever the predefined system events 602 are implemented, the built-in sampling process 106 is triggered. And the spatiotemporal system sampling 302 is collected automatically. The samplings triggered by system events 602 are necessarily required. In one embodiment, only the required system sampling 302 is collected, the system flow can be processed to the next step.

The spatiotemporal sampling can also be associated with the user side actions 604. That's, the users can actively trigger the built-in sampling process function 106. And the suggested spatiotemporal information 304 is collected by the said platform and/or systems. The user side samplings 304 can be alternative ways to implement the invention, and/or as a good complementary.

That's say, this invention can be implemented solely either with the system side sampling 302 which triggered by the system side events/actions 602 or with the user side sampling 304 which triggered by the user side events/actions 604. This invention can also be implemented jointly with the system and user side samplings 302 304. By doing this, the reliability degree of the crowd sourcing buyers could be increased with these extra user side samplings 304 that actively triggered by users.

For exactly what system events 602 and/or user actions 604 that need to trigger the corresponding spatiotemporal samplings 302, 304, are based on specific system designs.

Take the crowd sourcing buyers for example, the system spatiotemporal samplings 302 can be triggered by the critical system events 602 such as: registration 602A, taking information (photos and/or videos for the requested purchasing goods, for the parcel receipt, etc.) via the said platform 602B, uploading the requested photos and/or videos to the said platform 602C, and so on.

Except the above discussed system events 602, the spatiotemporal sampling can also be actively provided from the user side events 604. These extra user side samplings 304 can be but not limited to: when buying the requested purchasing goods 604A, when taking the traffic and heading to the requesters' place (for example at the airport of place B) 604B, when arriving the requesters' place A 604C, when posting the requested purchasing goods 604D, etc.

For both of the system 302 and/or user samplings 304, the categories of events and/or actions are also recorded and stored together with the obtained samplings. For example, the samplings 602A-602C are categorized as system sampling, the samplings 604A-604D are categorized as user sampling. In this invention, the categories associated with the samplings are denoted as sampling tags.

As an example, assuming there are M system samplings and N user samplings, the overall sampling data structure can be as illustrated in FIG. 3.

The similar sampling process can be implemented for the requesters as well. The system events that involved sampling for the requesters can be but not limited to: registration, tasks publishing, purchasing order submission, etc. The user side events that involved sampling can be but not limited to: when in the registered living address, etc.

8.3 Authentication

The purpose of the authentication process 108 here is to confirm the origin and integrity of the samplings 300. Whenever the triggered data obtaining process 106 are took and data uploaded to the said platform and/or systems. The authentication process 108 is implemented.

One implementation example could be the digital signature algorithm (DSA) [11]. A digital signature 412 is a mathematical scheme for demonstrating the authenticity of digital messages or documents. A valid digital signature 412 gives a recipient reason to believe that the message was created by a known sender (authentication 400), that the sender cannot deny having sent the message (non-repudiation), and that the message was not altered in transit (integrity). Digital signatures 412 are a standard element of most cryptographic protocol suites, and are commonly used for software distribution, financial transactions, contract management software, and in other cases where it is important to detect forgery or tampering.

Figure 4:
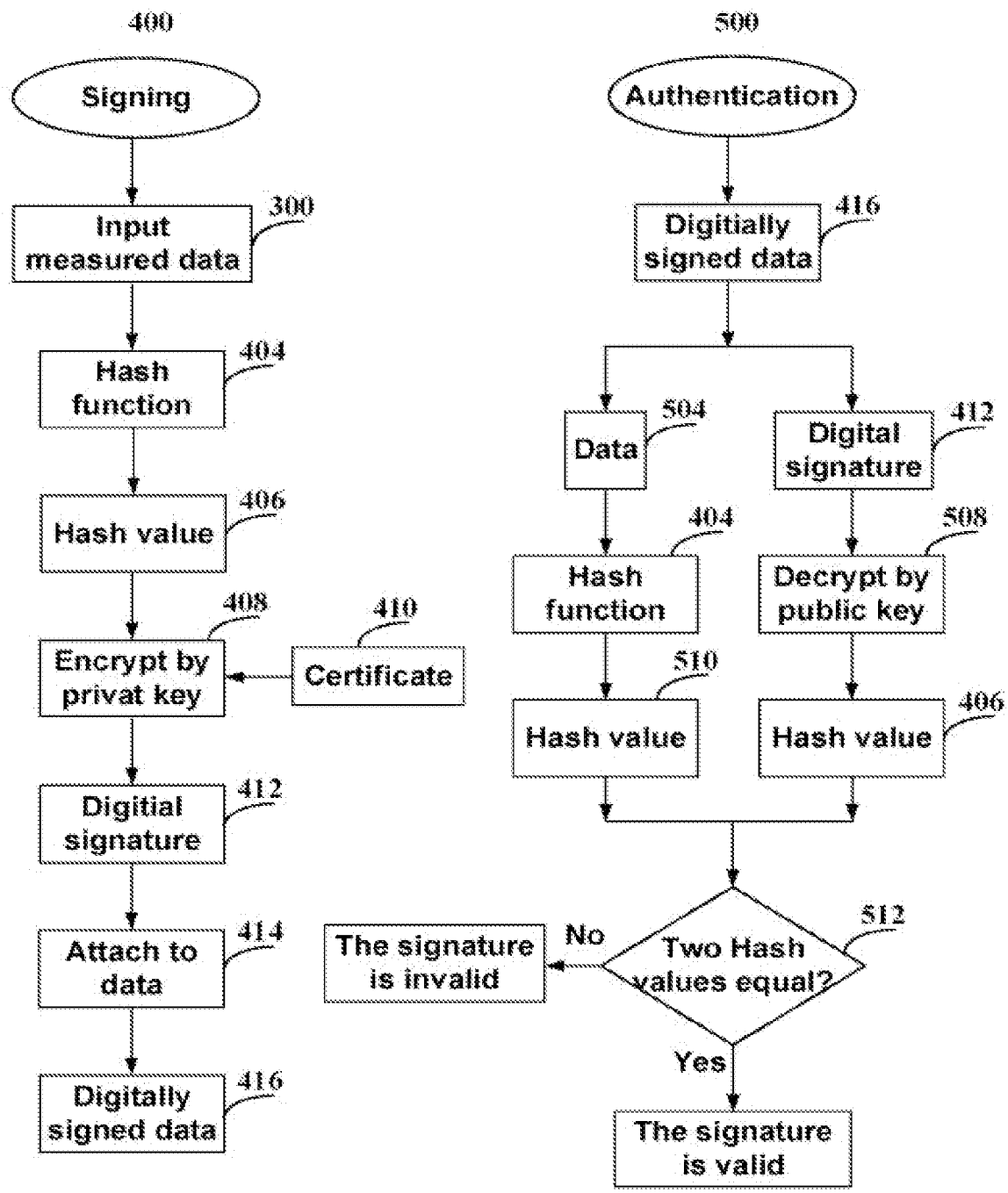
FIG. 4 shows a flow chart illustrating the data authentication.

The flowchart FIG. 4 illustrated how the DSA is applied to the sampling data 300. The sampling data 300 first goes through the cryptographic HASH algorithm/function 404 such as the MD-5, SHA-1, SHA-256, SHA-512, etc. [9]. A 'message digest' or HASH value 406 is generated for the input sampling data 300 by the HASH function 404. Then the HASH value 406 is encrypted by the sender's private key 408 to form the digital signature 412, and attached to the sampling data 414. It is noticed that a digital certification 410, which provided by a certificate authority (CA), may also be attached with the digitally signed data 416. Up to here, the digital signing process 400 is finished.

For the verification process 500, the receiver first uses the public key of the CA to get the sender's public key. Secondly, the receiver uses the sender's public key to decrypt 508 the sender's digital signature 412 to get the HASH value 406. Then, the receiver apply the same HASH function 404 to the received sampling data 504 to get a new HASH value 510. If these two HASH values 510, 406 are the same, we can say the digital signature and the received sampling data are valid.

The above listed properties of the cryptographic DSA makes it an ideal choice of the authentication process 108 for the said platforms and/or systems. Except the cryptographic DSA, this invention does not specify any specific authentication method, and many other applications are possible.

8.4 The Stamped Data Chain

The stamped spatiotemporal data chain is rebuilt from the collected data 300 as illustrated in the FIG. 3. The rebuilding process 110 can be implemented step-by-step below.

Step 1, separate the system 302 and user 304 samplings.

Step 2, sort or classify the sampling data. The sorting method can be based on the sampling tags and/or time stamps. The sampling tags may be mapped into numbers, letters of alphabet for convenience. For example, A corresponds to 'registration', B for 'taking photos/videos of the purchased goods', and so on.

Step 3, extract and/or generate the GPS coordinates for each of the sorted sampling. For samplings already have the GPS coordinates, the said platforms and/or systems simply extract the GPS coordinates. For the other samplings, for example a photo with only street name, the GPS coordinates are generated by recognizing the street name first and then calling the geocoding APIs to get the GPS coordinate.

Step 4, transform the time stamp of the sorted samplings to the same format. A standard time zone (for example the Central European Time, CET) is defined by the said system and/or platform, and all the other collected time stamps are converted to the standard time zone.

One example of the rebuilt stamped data chain 600 is given in FIG. 5.

8.5 Matching

The matching process 112 is implemented by comparing the rebuilt stamped data chain 600 as illustrated in FIG. 5, with the reference data chain 200 as illustrated in FIG. 2.

The item pairing is firstly implemented. That's, some items from the reference data chain 200 and some from the stamped data chain 600 are paired together. One recommend pairing method can be based on the category of items. For example, the 'Departure' item 204 from the reference data chain 200 in FIG. 2, is actually the same category with the 'Leaving' item 604B from the stamped data chain 600 in FIG. 5. Thus, these two items can be paired together for comparison. Please be noted that, this invention does not specify any specific paring methods, and many implementation choices are possible.

Secondly, different thresholds are defined and applied for measuring the matching degree of paired items. The said threshold can be distance difference, time difference, and/or any other forms based on distance and/or time such as the relatively errors. For example, the expected departure time $t_1$ should be 09:AM CET, 20171004 in the 'Departure' item 204 from the reference data chain 200 in FIG. 2. Assume the obtained actual departure time is $t_2$, the time difference $t_d$ is $t_d=t_2-t_1$. Then thresholds can be designed as a set of time difference values, e.g. [ . . . , −5, 0, 5, . . . ]. And the matching degree, may be set as $-5 \leq t_d \leq 0$ (i.e. [−5 0]) corresponding to 100% matching degree, $0 < t_d < 5$ (i.e. (0 5)) corresponding to 80%, and so on. As shown by 604B in FIG. 5, the actual departure time is 07:AM CET, 20171004. The time difference $t_d$ is −2. Thus, the outputted matching degree is 100% according to the above definition. As stated in the beginning of the paragraph, different types of thresholds, e.g. time difference, distance difference, etc. can be jointly used to determine the matching degree of paired items. As another example, the relatively errors can be used as thresholds to determine the matching degrees. That's the threshold interval [10% 20%) may corresponding to 100% matching degree, [20% 40%) may corresponding to 80% matching degree, etc. As shown by the 'Departure' time 204 and the 'Arrival' item 206, the expected time duration is 30.5 hours between the expected departure and arrival. The actual time duration is 33 hours as illustrated by the 604B 'Leaving' and 604C 'Arriving'. Then the relative error is (33−30.5)/30.5=8.2%. Thus, the outputted matching degree is 100% according to the above definition.

Finally, the reliability degree of each item is generated and outputted 114 based on the matching degree of paired items. The platform may determine what follow-up actions should response to the crowd sourcing buyers and/or requesters based on the suggested validity and reliability degree.

8.6 Alternative Ways

The above discussed verification process 100 can not only be applied to users (i.e. buyers, and requesters) but also for tasks. Which means, it can be also designed as task centric. Instead of the crowd sourcing buyers, the target subject can be changed to buying task for example.

The sampling information from the triggered data obtaining process, can be many forms which are summarized in the FIG. 6.

9 Additional Considerations

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss generality. The described operations and their associated modules may be embodied in software, firmware, hardware, or any combinations thereof. In one embodiment, a software module is implemented with a computer program product comprising a persistent computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a persistent computer readable storage medium or any type of media suitable for storing electronics instructions, and coupled to a computer system bus. Furthermore, any computing systems, referred to in the specification may include a single processor or may be architectures employing multiple processor designs for increased computing capability.

Finally, the language used in the specifications has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, an example of which is set forth in the following claims.

10 REFERENCES

[1] www.mturk.com
[2] www.unber.com
[3] www.airbnb.com

[4] H. Chao, Y. Chen, P. Sameera, and D. Saumitra, "Method and Apparatus for Trajectory Crowd Sourcing for Updating Map Portal Information", US2016084658 A1.
[5] M. L. Marti, R. Mayor, M. S. Ma, "Location Fingerprinting", US2014171118 A1.
[6] B. M. Mahesh, "System and Method for Managing A Single Point of Sale of Plurality of Merchandise from Plurality of Retailer", US2015242829 A1.
[7] S. Kirkham and M. Lewis, "Identity and Trustworthiness Verification Using Online and Offline Components", US 20150156208 A1, Published June 2015.
[8] https://www.google.se/maps
[9] http://www.geopostcodes.com/
[10] https://developer.here.com/documentation/geocoder/
[11] https://en.wikipedia.org/wiki/Digital_signature
[12] https://en.wikipedia.org/wiki/Cryptographic_hash_function

What is claimed is:

1. A method for verifying validity and reliability of one or more users of a crowd sourcing purchasing platform and/or system, comprising the steps of:
   extracting a reference data chain, which is a list of data containing where and when an expected task should be implemented by the users, from pre-set information supplied by the users;
   obtaining data by a sampling process, containing spatiotemporal information which includes a location and time stamp of a user action; the data obtaining process is triggered by one or more pre-defined system events and/or by one or more user actions;
   authenticating the obtained data, to confirm origin and integrity thereof;
   rebuilding a stamped data chain, which is a list of data with locations and timestamps for a user task, from the obtained data;
   matching the stamped data chain rebuilt from the obtained spatiotemporal data with the reference data chain extracted from the pre-set information supplied by the users;
   determining degree of the validity and reliability of the users based on a matching degree.

2. The method of claim 1, wherein the obtained data that comprises one or more of GPS coordinates, time stamps, photos, audios, videos, and IP addresses.

3. The method of claim 1, wherein the one or more pre-defined system events that can trigger the step of data obtaining comprise one or more of registration, obtaining information via the platform and/or system, and uploading information.

4. He method of claim 3, wherein obtained information taken via the platform and/or system comprises one or more of photo, video, and audio.

5. The method of claim 3, wherein information uploaded comprises one or more of photo, video, and audio.

6. The method of claim 1, wherein the one or more pre-defined system events that can trigger the step of data obtaining comprise updating status of one or more of the tasks.

7. The method of claim 6, wherein the step of updating comprises one or more of accepting a task, implementing a task, and delivering a requested task result.

8. The method of claim 1, wherein the user actions that can trigger the step of data obtaining comprise one or more user behavior of buying, posting, delivering and using a transportation.

9. The method of claim 8, wherein using a transportation comprises departure and/or arrival of the expected task implementation place.

10. The method of claim 1, wherein the step of rebuilding the stamped data chain comprises extracting the spatiotemporal information from the obtained data and rebuilding the stamped data chain from the extracted spatiotemporal information.

11. The method of claim 1, wherein step of matching is to match the actual spatiotemporal information of implemented user actions from the stamped data chain with the pre-set spatiotemporal information from the reference data chain supplied by the users.

12. The method of claim 11, wherein the reference data chain is used to pre-set expected geographic location and/or time for implementing the crowd sourcing task.

13. The method of claim 12, wherein the expected geographic location and/or time for implementing the crowd sourcing task is the expected spatiotemporal data chain from using a transportation.

14. The method of claim 1, wherein the reference data chain is used to pre-set expected geographic location and/or time for implementing the crowd sourcing task.

15. The method of claim 12, wherein the reference data chain is the expected spatiotemporal data chain from using a transportation.

16. The method of claim 1, further comprising a step of introducing one or more thresholds to determine the degree of the validity and reliability of the users, the thresholds being used to determine the matching degree for the reference data chain and the stamped data chain.

17. The method of claim 16, wherein the thresholds comprise one or more of distance difference, time difference, and/or any other forms based on distance and/or time.

18. The method of claim 1, wherein further system actions including refusing paying the user and raising or lowering a user level rating are made based on the degree of the validity and reliability that is determined.

* * * * *

UNITED STATES PATENT AND TRADEMARK OFFICE
CERTIFICATE OF CORRECTION

PATENT NO. : 11,799,873 B2
APPLICATION NO. : 16/953375
DATED : October 24, 2023
INVENTOR(S) : Shaode Zu and Xianwei Willam Shen Page 1 of 1

It is certified that error appears in the above-identified patent and that said Letters Patent is hereby corrected as shown below:

On the Title Page

Add missing Foreign Priority:
SWEDEN 1730321-5 11/19/2017

Signed and Sealed this
Sixth Day of May, 2025

Coke Morgan Stewart
*Acting Director of the United States Patent and Trademark Office*